Dec. 16, 1969  F. THOMA  3,483,855
CONTROL DEVICE FOR LIQUID SYSTEMS OPERABLE IN DEPENDENCE
ON A PHYSICAL PROPERTY OF THE LIQUID
Filed March 17, 1966
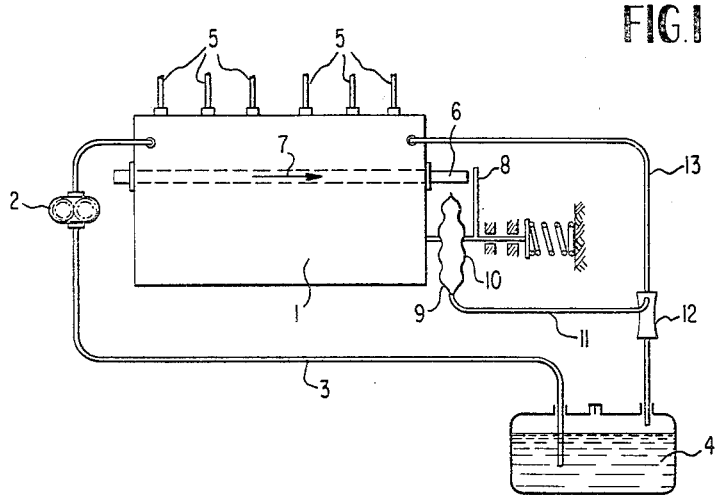
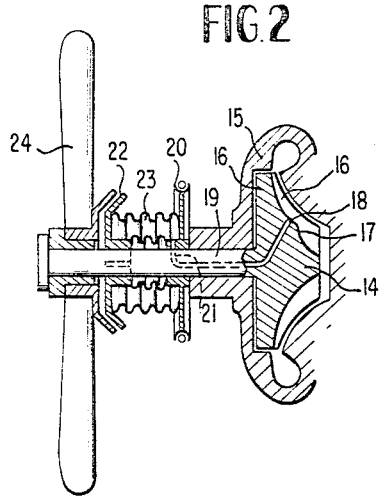
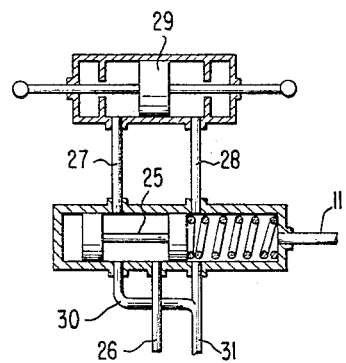
INVENTOR.
FRANK THOMA
BY
Dicke + Craig
ATTORNEYS United States Patent Office 3,483,855
Patented Dec. 16, 1969

3,483,855
CONTROL DEVICE FOR LIQUID SYSTEMS OPERABLE IN DEPENDENCE ON A PHYSICAL PROPERTY OF THE LIQUID
Frank Thoma, Stuttgart, Germany, assignor to Daimler-Benz Aktiengesellschaft, Stuttgart-Unterturkheim, Germany
Filed Mar. 17, 1966, Ser. No. 535,245
Claims priority, application Germany, Mar. 18, 1965, D 46,824
Int. Cl. F02d 1/08; F01p 7/08
U.S. Cl. 123—140                                    9 Claims

ABSTRACT OF THE DISCLOSURE

An improvement and further development of a control device for liquid supply systems and circulation systems which is effective in dependence on the temperature and/or some other physical property of the utilized liquid. An engine cooling fan provided with a drive shaft common with the engine cooling water centrifugal pump may be provided with a venturi restriction between the blades of the pump having a bleed line at the restriction throat to sense the vapor pressure and operate a pressure responsive clutch for engaging the fan only at relatively at high water temperatures producing correspondingly high vapor pressures. Also, an internal combustion engine having a fuel injection system with a full load fuel regulating mechanism may be provided with a venturi restriction in the fuel pressure line with a bleed off line connected at the throat to determine the vapor pressure for operating an expansible chamber device automatically adjusting the full load position. A servo motor may be operatively connected between the vapor pressure determining means and the device performing the control function.

Background of the invention

In order to compensate for the fluctuations of the control effect of different or differently warm liquids, conditioned by the different modulus of elasticity, the different specific weight or a different specific viscosity, by means of a corresponding quantity regulation automatically operable regulating installations have been already proposed heretofore. These prior art installations were influenced by the specific weight of the liquid, for example, by means of a float-type control or regulation. The float-type regulating system, however, has the disadvantage of a high sensitivity to vibrations and shocks as well as to the angle of inclination. Accordingly, attempts have been made heretofore to realize this type of control also by viscosity control devices which operate with capillary lines of predetermined length. However, the latter again require a very accurate maintenance of a predetermined pressure and of a predetermined flow quantity.

Summary of the invention

The present invention eliminates the disadvantages of these known regulating systems and renders utilizable for the intended regulating purpose the vapor pressure of the liquid to be supplied or of the liquid of the circulation system.

Accordingly, the present invention consists of a cavitating ejector nozzle, especially of venturi shape, which is effective either directly or by way of an intermediate member responsive to pressure, such as a diaphragm pressure box, a pressure-actuated spring-loaded piston, or servo slide valve. Such cavitating ejector nozzle is a nozzle which reduces the operating pressure of the liquid flowing through the same to the vapor pressure thereof.

Such an arrangement is extremely simple from a constructive point of view, is compact in construction and has no movable parts, yet possesses a high work capacity. Additionally, such an arrangement is insensitive, within wide limits, to fluctuations of the operating pressure.

Accordingly, it is an object of the present invention to provide a regulating device of the type described above, operable to compensate for changes in the physical properties of a liquid, which eliminates by extremely simple and operationally reliable means the shortcomings and drawbacks mentioned hereinabove which were encountered in the prior art constructions.

Another object of the present invention resides in a regulating installation for liquid supply or circulation systems which is operable in dependence on a physical property of the utilized liquid but which is substantially insensitive to possible vibrations as well as to changes in the position and therewith in the angle of inclination.

A further object of the present invention resides in a regulating installation which obviates the need of maintaining, with great accuracy, the pressure and/or flow quantities of the liquid in order to obtain satisfactory regulating results.

Still another object of the present invention resides in a regulating device operable in dependence of a physical property of the liquid which, notwithstanding its simplicity in construction utilizing few, relatively inexpensive parts, has a high work capacity with great sensitivity.

Brief description of the drawing

These and further objects, features and advantages of the present invention will become more obvious from the following description when taken in connection with the accompanying drawing, which shows, for purposes of illustration only, several embodiments in accordance with the present invention, and wherein:

FIGURE 1 is a schematic diagram of a regulating installation in accordance with the present invention used in connection with a fuel quantity regulating system for the injection pumps of an internal combustion engine;

FIGURE 2 is a somewhat schematic axial cross sectional view of a regulating device in accordance with the present invention which is operable in dependence on the cooling water temperature of a cooling liquid circulation system and is used in conjunction with a disengageable radiator fan of a motor vehicle, and FIGURE 3 is a schematic cross sectional view through a modified embodiment of a regulating device in accordance with the present invention for use with a servo control system.

Detailed description of the drawing

Referring now to the drawing, wherein like reference numerals are used throughout the various views to designate like parts, and more particularly to FIGURE 1, in which a fuel regulating system for the injection pump of an internal combustion engine is used as example for a consuming device of the liquid, the embodiment illustrated in this figure is of advantage in particular for internal combustion engines operated with different fuels. The smaller modulus of elasticity of a lighter fuel or of a fuel warming up, for example, in the course of the operation, causes a smaller injection quantity with an unchanged position of the injection-pump regulating device, for example, of the regulating rack thereof. Additionally, by reason of the smaller specific weight, even with the same injection volume, less fuel weight is injected. Since the calorific value per kilogram of fuel is substantially the same with the customery fuels, a smaller energy quantity is supplied to the engine. The output loss caused by the phenomena described above, are avoided by the present invention.

In FIGURE 1, reference numeral 1 designates a conventional injection pump to which fuel is supplied by means of a supply pump 2 by way of line 3 from a tank 4. The pressure lines of the pump leading to the injection nozzles are designated in this figure by reference numeral 5 while the control rack of the fuel pump is designated by reference numeral 6. The arrow 7 indicates the direction of movement of the control rack 6 toward its full-load position. The full-load position is limited by a resilient abutment 8.

According to the present invention, a stationary membrane or diaphragm box 9 of conventional construction is arranged at any suitable place, whose resilient wall 10 influences the abutment 8. This box 9, 10 is connected by way of a line 11 with a cavitating ejector nozzle 12, preferably of Venturi nozzle shape, which reduces the operating pressure of the liquid flowing therethrough to the vapor pressure thereof. The nozzle 12 may be arranged at any suitable place of the fuel lines 3 and 13 upstream and downstream of the pump 1, either directly in these fuel lines or in a parallel connection with respect thereto. The arrangement in the return line 13 is preferred because any favoring for the foam formation in the supply line of the pump has to be avoided as much as possible.

The operation of the device according to the present invention is believed self-evident from FIGURE 1. If the fuel temperature increases or a specific, more lightweight fuel is utilized, then the vapor pressure increases in the nozzle 12. Accordingly, the pressure in the line 11 increases and also that in the box 9, 10. The box 9, 10 expands and causes the abutment 8 to remove itself from the end of the control rack 6 facing the same, whereby the control rack 6 follows this movement by the effect of the customary adjusting mechanism associated with the pump. As a result thereof, the full-load position is adjusted to a larger fuel injection quantity and the reduction of the injection quantity caused by the changed temperature, viscosity or other physical properties of the utilized fuel is again equalized whereby even an additional injection quantity is available for the compensation of the loss in calorific power. The cavitating nozzle 12 should be so constructed that with every possibly occurring fuel supply-pressure, the vapor pressure of the flowing-through fuel is achieved at the narrowest cross section thereof.

The embodiment of FIGURE 2 illustrates the application of the present invention to a disengageable radiator fan for motor vehicles controlled by the cooling water temperature. With such an arrangement, there exists the control prerequisite that with a cold cooling water, the fan stands still and starts to rotate beginning with a predetermined water temperature.

For this purpose the rotor 14 of the cooling water pump 15 of the engine is provided at a place between two blades 16 with a raised portion 17 which together with the oppositely disposed pump housing wall section again forms a venturi-nozzle-like flow channel or passage section. A channel or duct 18 provided in the rotor 14 leads from this venturi-nozzle-like flow channel section by way of the rotor shaft 19 to a cross bore 21 provided, for example, in the hub of the liquid pump drive wheel 20, which cross bore terminates in a pressure box 23 controlling the movable part of the radiator fan clutch 22.

The operation of the arrangement according to FIGURE 2 is as follows:

As long as the cooling water still remains cold, the clutch 22 remains disengaged and the fan 24 either stands still or rotates loosely, for example, with a moving motor vehicle only under the pressure of the dynamic air flowing through the radiator. As soon as the cooling water has warmed up to such an extent that its cooling becomes appropriate, the vapor pressure at the passage 17 also increases to such an extent that the pressure also increasing in the duct 18 and in the box 23 engages the clutch 22 and the fan 24 begins to rotate. By the use of conventional, known means, care may be taken that the clutch operates with delay with respect to its adjusting impulse and that the fan does not exceed a predetermined rotational speed. Such installation, for example, spring detents, resistances or abutments for the movable parts of the adjusting means are known, per se, and form no part of the present invention.

Instead of causing the vacuum to act directly, it is also possible in accordance with the present invention to cause the vacuum to act by way of a servo amplifier on the pressure-responsive regulating installation as shown for example in FIGURE 3. In this case, the vacuum, for example, in line 11 controls a piston 25 constructed as control slide valve, which permits a separate pressure medium supplied through a line 26 to act, dependent on its end position, on one or the other side of an adjusting piston 29 by way of the lines 27 or 28 and again removes or relieves the pressure from the piston side not loaded or acted upon at a particular time by way of the lines 30 or 31.

While I have shown and described several embodiments and applications of the present invention, it is understood that the same is not limited thereto but is susceptible of numerous changes and modifications as known to a person skilled in the art. For example, it is also within the scope of the present invention to cause either alone or simultaneously with the engagement and disengagement of radiator fan, the opening and closing of a radiator jalousie by means of the regulating installation of the present invention, and/or to actuate a change-speed gear, a slidable gear wheel or a slidable member for a belt drive or the like. The application of the vapor pressure regulating or control system according to the present invention by means of a pressure responsive device with a pre-connected cavitating nozzle is therefore possible at every place, where the influence of temperature or other physical property of the liquid are to be eliminated or are to be utilized for predetermined control and regulating purposes. Possibly an electric installation may also be utilized for the servo force whereby the pressure responsive installation then actuates an electric switch.

Thus, it is obvious that the present invention is not limited to the details shown and described herein but is susceptible of numerous changes and modifications as known to a person skilled in the art and I therefore do not wish to be limited to the details shown and described herein but intend to cover all such changes and modifications as are encompassed by the scope of the appended claims.

I claim:

1. For use in an internal combustion engine: fuel injection means having full load regulating means; means actuatable to adjust the full load regulating means; control means sensing the vapor pressure of the fuel and responsive to the sensed vapor pressure to automatically actuate said means to adjust the full load regulating means.

2. The combination according to claim 1, further comprising a fuel pressure line, and wherein said control means includes cavitating ejector nozzle means in said fuel pressure line for determining the vapor pressure throughout the entire operating range of the device.

3. The combination according to claim 2, wherein said ejector nozzle means is constructed as venturi nozzle.

4. The combination according to claim 2, wherein said injection means includes an injection pump having a return line, said ejector nozzle means being arranged in the return line.

5. The combination according to claim 2, wherein said injection means includes a control rack, said means to adjust including an adjustable full load abutment for said control rack, said control means including an expansible chamber pressure-responsive device acting on said full load abutment in such a manner that with an increasing warm up of the fuel or with the use of a specific lighter weight fuel the control rack is adjusted to a full load position supplying so much more fuel that the output of the engine remains substantially constant.

6. The combination according to claim 4, wherein said injection means includes a control rack, said means to adjust including an adjustable full load abutment for said control rack, said control means including an expansible chamber pressure-responsive device acting on said full load abutment in such a manner that with an increas-warm up of the fuel or with the use of a specific lighter weight fuel the control rack is adjusted to a full load position supplying so much more fuel that the output of the engine remains substantially constant.

7. The combination according to claim 6, said control means including servo means with slide valve means, and means for controlling the position of the slide valve means by the sensed vapor pressure.

8. The combination according to claim 1, said control means including servo means with slide valve means, and means for controlling the position of the slide valve means by the sensed vapor pressure.

9. The combination according to claim 2, said control means further comprising servo means with slide valve means, and means for controlling the slide valve means by the vapor pressure produced by said ejector nozzle means.

References Cited

UNITED STATES PATENTS

| 2,284,938 | 6/1942 | Olsen Jr. | 236—35 |
| 2,855,909 | 10/1958 | Stefan | 236—35 |
| 2,897,809 | 8/1959 | Forster | 123—140.3 |
| 3,056,282 | 10/1962 | Boyd Jr. | 73—64.2 |
| 3,228,382 | 1/1966 | Stefan | 236—35 XR |

FOREIGN PATENTS

| 868,228 | 5/1961 | Great Britain. |
| 870,910 | 1/1942 | France. |

LAURENCE M. GOODRIDGE, Primary Examiner

U.S. Cl. X.R.

123—41